United States Patent
You et al.

(10) Patent No.: US 12,476,950 B2
(45) Date of Patent: Nov. 18, 2025

(54) METHOD, DEVICE, AND SYSTEM FOR AUTHENTICATION AND AUTHORIZATION WITH EDGE DATA NETWORK

(71) Applicant: ZTE Corporation, Shenzhen (CN)

(72) Inventors: Shilin You, Shenzhen (CN); Jiyan Cai, Shenzhen (CN); Qing Wang, Shenzhen (CN); Jigang Wang, Shenzhen (CN); Yuze Liu, Shenzhen (CN); Jin Peng, Shenzhen (CN); Zhen Xing, Shenzhen (CN); Zhaoji Lin, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 308 days.

(21) Appl. No.: 18/336,774

(22) Filed: Jun. 16, 2023

(65) Prior Publication Data
US 2023/0336535 A1    Oct. 19, 2023

Related U.S. Application Data

(63) Continuation of application No. PCT/CN2021/072388, filed on Jan. 18, 2021.

(51) Int. Cl.
*H04L 9/40* (2022.01)

(52) U.S. Cl.
CPC ............ *H04L 63/08* (2013.01); *H04L 63/062* (2013.01)

(58) Field of Classification Search
None
See application file for complete search history.

(56) References Cited

U.S. PATENT DOCUMENTS

| | | | |
|---|---|---|---|
| 2007/0127420 A1* | 6/2007 | Tjandra | H04W 12/069 370/338 |
| 2013/0166456 A1* | 6/2013 | Zhang | G06Q 20/38215 705/67 |
| 2019/0036917 A1* | 1/2019 | Sun | H04L 63/12 |
| 2020/0413228 A1* | 12/2020 | Suzuki | H04W 4/90 |

(Continued)

FOREIGN PATENT DOCUMENTS

| | | |
|---|---|---|
| KR | 20200115333 A | 10/2020 |
| KR | 2020-0130106 A | 11/2020 |

(Continued)

OTHER PUBLICATIONS

Chinese Office Action with English Translation, dated Apr. 11, 2024, pp. 1-20, issued in Chinese Patent Application No. 202180086428.0.

(Continued)

*Primary Examiner* — Raqiul A Choudhury
(74) *Attorney, Agent, or Firm* — Crowell & Moring LLP (57) ABSTRACT

This disclosure generally relates to User Equipment (UE) authentication and authorization with an edge data network in communication networks. Such authentication and authorization may be based on the generation and application of an edge computing key for a UE. Such edge computing key may be used for bi-directional authentication and may be dynamically updated during various stages of the authentication and authorization process. The authentication and authorization supports a UE connected to multiple Access Management Functions (AMFs) belonging to different Public Land Mobile Networks (PLMNs).

17 Claims, 8 Drawing Sheets

(56) References Cited

U.S. PATENT DOCUMENTS

2021/0084554 A1* 3/2021 Chen ................. H04W 36/1443
2021/0312033 A1* 10/2021 Kirkeby ............. G06Q 30/0185

FOREIGN PATENT DOCUMENTS

| WO | WO 2019/213946 A1 | 11/2019 |
| WO | WO 2020/036883 A1 | 2/2020 |
| WO | WO 2020/223364 A1 | 11/2020 |

OTHER PUBLICATIONS

3GPP TSG-SA3 Meeting #100bis-e S3-202620, Samsung, Resolving editor's note on AKMA key derivation, e-meeting, Oct. 12-16, 2020, pp. 1-2.
Extended European Search Report in European Patent Application No. Application No. 21918666.5 dated Jun. 27, 2024, 8 pages.
Lenovo et al. "Update of Solution #7", 3GPP TSG-SA3 Meeting #102e, S3-210430, Jan. 18, 2021, 5 pages.
ZTE, "New solution: Authentication and Authorization with ECS/EES/EAS" 3GPP TSG-SA3 Meeting #103-e, S3-211565, May 17, 2021, 5 pages.
International Search Report in International Patent Application No. PCT/CN2021/072388 dated Oct. 8, 2021, 3 pages.
3rd Generation Partnership Project, "Study on Security Aspects of Enhancement of Support for Edge Computing in 5GC (Release 17)," 3GPP TR 33.839 V0.3.0 (Dec. 2020), Dec. 3, 2020, 54 pages.

* cited by examiner

METHOD, DEVICE, AND SYSTEM FOR AUTHENTICATION AND AUTHORIZATION WITH EDGE DATA NETWORK

CROSS-REFERENCE TO RELATED APPLICATION

This application is a continuation application of PCT International Patent Application No. PCT/CN2021/072388, filed with the China National Intellectual Property Administration, PRC on Jan. 18, 2021, which is herein incorporated by reference in its entirety.

TECHNICAL FIELD

This disclosure is directed to terminal device authentication and authorization with an edge data network in communication networks.

BACKGROUND

In a communication network, various applications and services may require low latency yet high performance computing, such as virtual reality (VR) and gaming applications, as well as enterprise and Internet of Things (IoT) services. Such applications and services may rely on Multi-access Edge Computing (MEC), or mobile edge computing, which brings the applications to the edge of the network to reduce latency and achieve high bandwidth. Efficient and robust dual end authentication on both a User Equipment (UE) and an edge computing network is critical for providing a trusted computing environment.

SUMMARY

This disclosure relates to UE authentication and authorization with an edge data network in communication networks, and in particular, to the generation and application of an edge computing key for a UE during the authentication and authorization process.

In some implementations, a method for establishing a secured communication link between a terminal device and a computing network providing application services is disclosed. The method may be performed by the terminal device in a communication network and may include generating a device computing key of the terminal device based on a unique identifier of the terminal device; generating a registration request signature based on raw data of a registration request with a configuration server of the computing network and an encryption key of an access server managing the terminal device; and sending a first message comprising the device computing key and the registration request signature to the configuration server for requesting service grant with the computing network.

In some other implementations, a method for authenticating a registration request from a terminal device managed by an access server is disclosed. The method may be performed by the access server and include receiving a verification request from an exposure server in a computing network, wherein the verification request comprises at least one of: a registration request initiated from the terminal device, the registration request being forwarded to the exposure server by a configuration server in the computing network used for requesting terminal device access to the computing network; or a registration request signature encrypted based on raw data of the registration request, an encryption key of the access server, and a message counter recording a count of messages sent from the terminal device to the configuration server; generating a local copy of the registration request signature based on raw data of the registration request and the encryption key of the access server; comparing the local copy of the registration request signature with the registration request signature in the verification request; and in response to the two signatures matching, sending a verification response to the exposure server.

In some other implementations, a method for authenticating a registration request from a terminal device performed by a configuration server in a computing network is disclosed. The method may include receiving a registration request from the terminal device, wherein the registration request comprises at least one of: a registration request signature encrypted based on raw data of the registration request, an encryption key of an access server managing the terminal device, and a message counter recording a count of messages sent from the terminal device to the configuration server; or a device computing key of the terminal device for accessing the computing network; sending a verification request to an exposure server in the computing network based on the device computing key for verifying the registration request, the verification request comprising at least one of: the device computing key; an identifier of the configuration server; or the registration request signature; and receiving a verification response comprising a configuration server key of the configuration server from the exposure server, the verification response.

In some other implementations, a device is disclosed. The device main include one or more processors, wherein the one or more processors are configured to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above embodiments and other aspects and alternatives of their implementations are explained in greater detail in the drawings, the descriptions, and the claims below.

DETAILED DESCRIPTION

Figure 1:
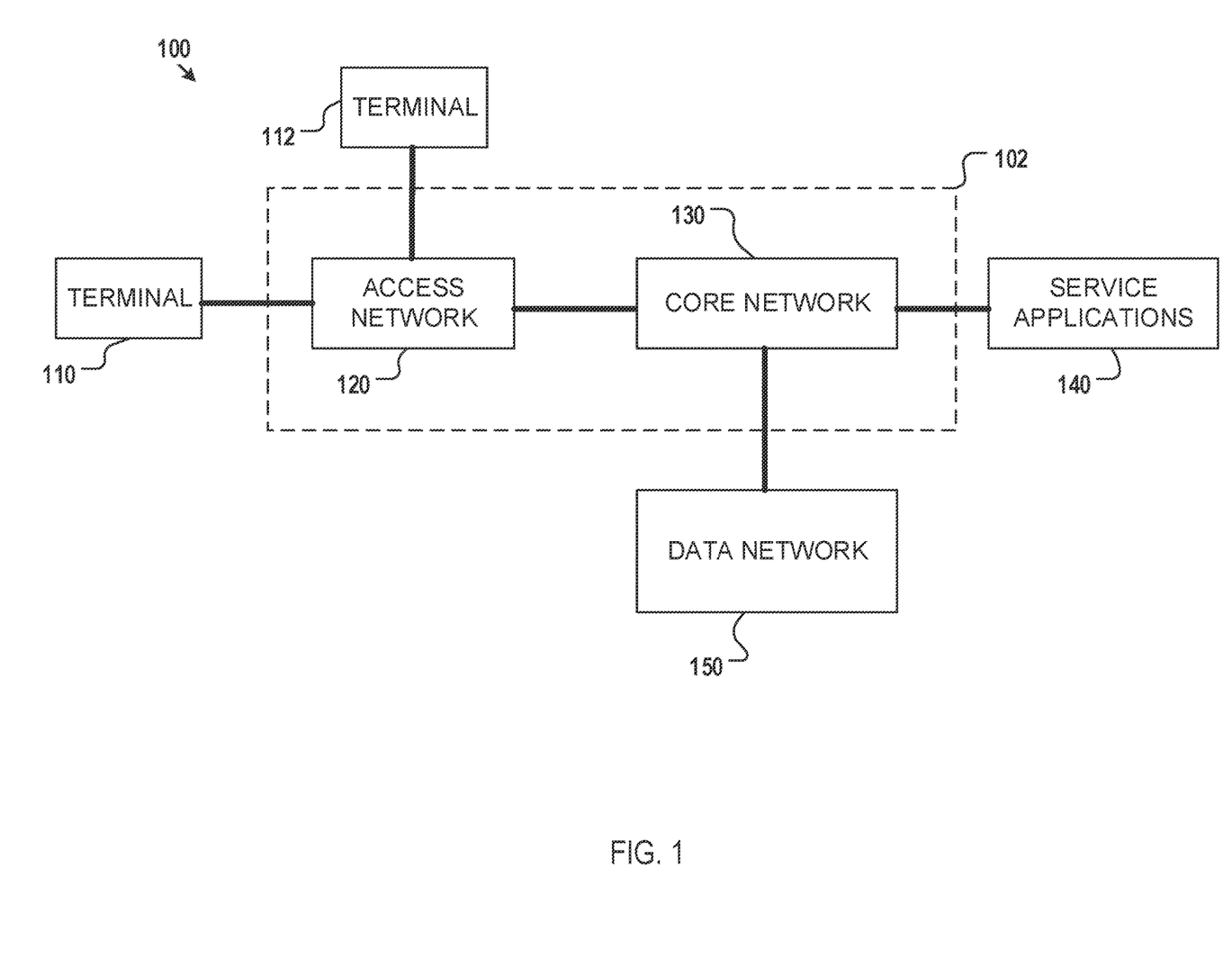
FIG. 1 shows an exemplary communication network including terminal devices, a carrier network, data network, and service applications.

An exemplary communication network, shown as 100 in FIG. 1, may include terminal devices 110 and 112, a carrier network 102, various service applications 140, and other data networks 150. The carrier network 102, for example, may include access networks 120 and a core network 130. The carrier network 102 may be configured to transmit voice, data, and other information (collectively referred to as data traffic) among terminal devices 110 and 112, between the terminal devices 110 and 112 and the service applications 140, or between the terminal devices 110 and 112 and the other data networks 150. Communication sessions and corresponding data paths may be established and configured for such data transmission. The Access networks 120 may be configured to provide terminal devices 110 and 112 network access to the core network 130. The core network 130 may include various network nodes or network functions configured to control the communication sessions and perform network access management and data traffic routing. The service applications 140 may be hosted by various application servers that are accessible by the terminal devices 110 and 112 through the core network 130 of the carrier network 102. A service application 140 may be deployed as a data network outside of the core network 130. Likewise, the other data networks 150 may be accessible by the terminal devices 110 and 112 through the core network 130 and may appear as either data destination or data source of a particular communication session instantiated in the carrier network 102.

The core network 130 of FIG. 1 may include various network nodes or functions geographically distributed and interconnected to provide network coverage of a service region of the carrier network 102. These network nodes or functions may be implemented as dedicated hardware network elements. Alternatively, these network nodes or functions may be virtualized and implemented as virtual machines or as software entities. A network node may each be configured with one or more types of network functions. These network nodes or network functions may collectively provide the provisioning and routing functionalities of the core network 130. The term "network nodes" and "network functions" are used interchangeably in this disclosure.

Figure 2:
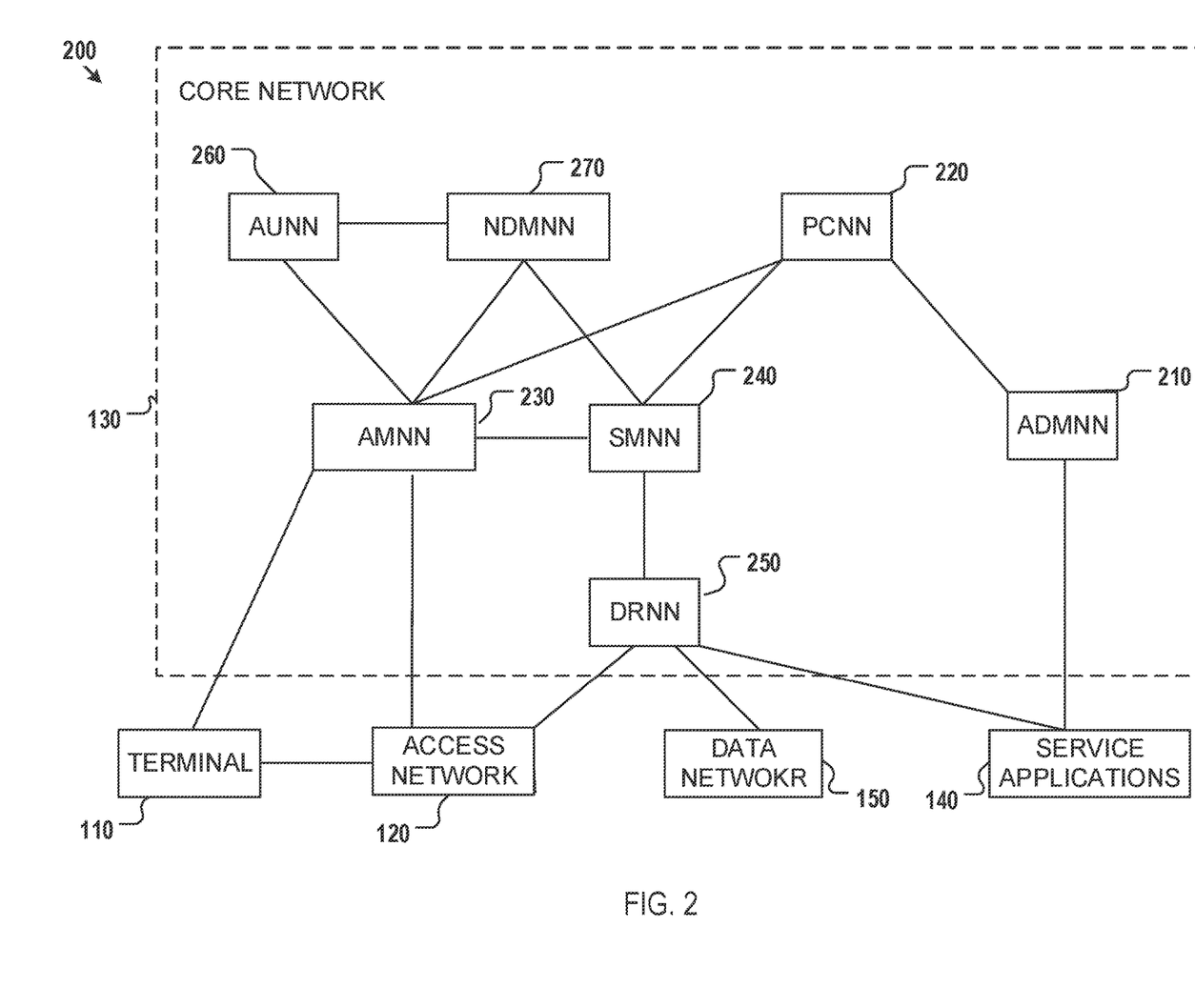
FIG. 2 shows exemplary network functions or network nodes in a communication network.

FIG. 2 further shows an exemplary division of network functions in the core network 130 of a communication network 200. While only single instances of network nodes or functions are illustrated in FIG. 2, those having ordinary skill in the art understand that each of these network nodes may be instantiated as multiple instances of network nodes that are distributed throughout the core network 130. As shown in FIG. 2, the core network 130 may include but is not limited to network nodes such as access management network node (AMNN) 230, authentication network node (AUNN) 260, network data management network node (NDMNN) 270, session management network node (SMNN) 240, data routing network node (DRNN) 250, policy control network node (PCNN) 220, and application data management network node (ADMNN) 210. Exemplary signaling and data exchange between the various types of network nodes through various communication interfaces are indicated by the various solid connection lines in FIG. 2. Such signaling and data exchange may be carried by signaling or data messages following predetermined formats or protocols.

Figure 3:
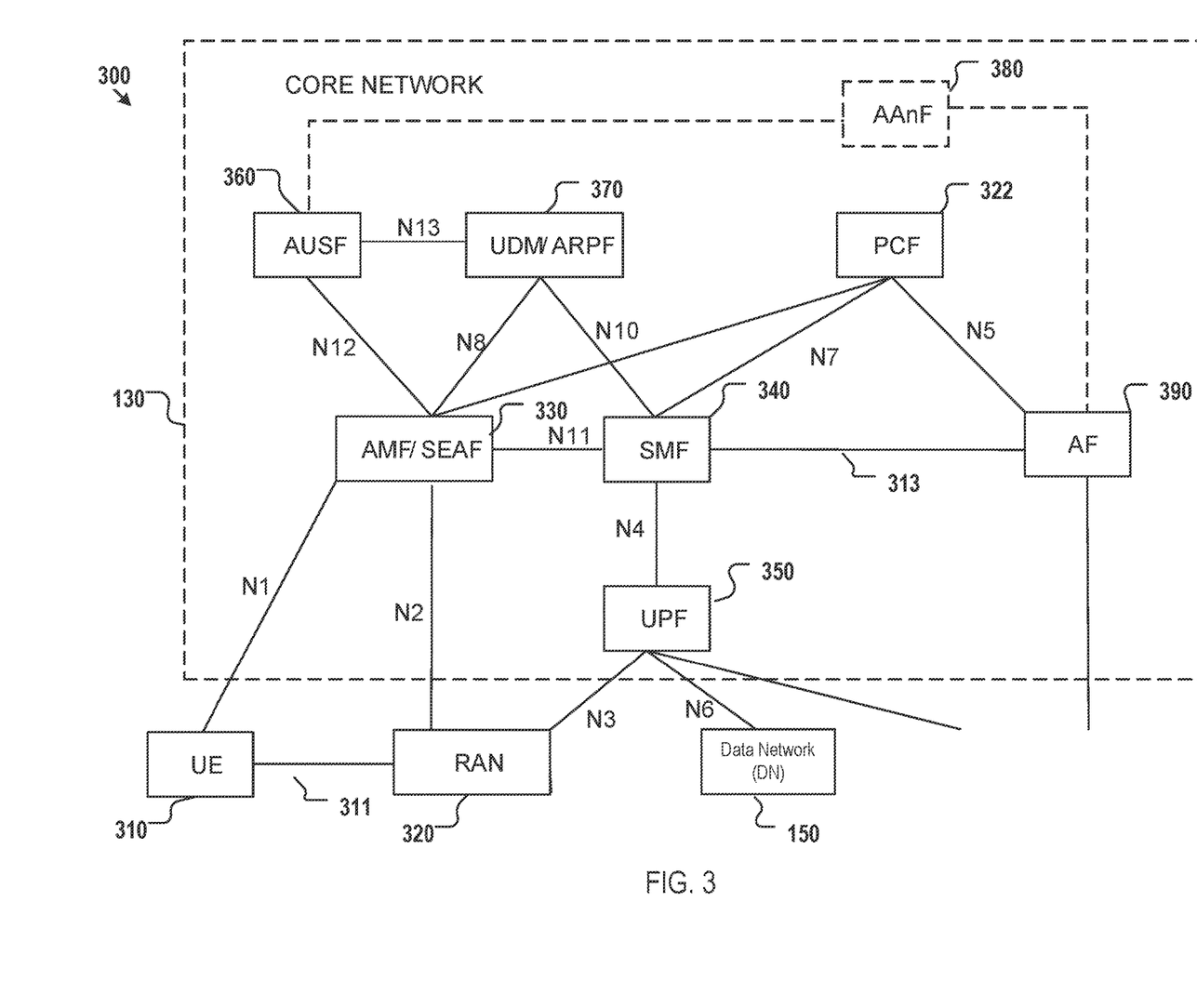
FIG. 3 shows exemplary network functions or network nodes in a wireless communication network.

The implementations described above in FIGS. 1 and 2 may be applied to both wireless and wireline communication systems. FIG. 3 illustrates an exemplary cellular wireless communication network 300 based on the general implementation of the communication network 200 of FIG. 2. FIG. 3 shows that the wireless communication network 300 may include user equipment (UE) 310 (functioning as the terminal device 110 of FIG. 2), radio access network (RAN) 320 (functioning as the access network 120 of FIG. 2), data network (DN) 150, and core network 130 including access management function (AMF) 330 (functioning as the AMNN 230 of FIG. 2), session management function (SMF) 340 (functioning as the SMNN 240 of FIG. 2), application function (AF) 390 (functioning as the ADMNN 210 of FIG. 2), user plane function (UPF) 350 (functioning as the DRNN 250 of FIG. 2), policy control function 322 (functioning as the PCNN 220 of FIG. 2), authentication server function (AUSF) 360 (functioning as the AUNN 260 of FIG. 2), and universal data management (UDM) function 370 (functioning as the UDMNN 270 of FIG. 2). Again, while only single instances for some network functions or nodes of the wireless communication network 300 (the core network 130 in particular) are illustrated in FIG. 3, those of ordinary skill in the art understand that each of these network nodes or functions may have multiple instances that are distributed throughout the wireless communication network 300.

In FIG. 3, the UE 310 may be implemented as various types of mobile devices that are configured to access the core network 130 via the RAN 320. The UE 310 may include but is not limited to mobile phones, laptop computers, tablets, Internet-Of-Things (IoT) devices, distributed sensor network nodes, wearable devices, and the like. The UE may also be Multi-access Edge Computing (MEC) capable UE which support edge computing. The RAN 320 for example, may include a plurality of radio base stations distributed throughout the service areas of the carrier network. The communication between the UE 310 and the RAN 320 may be carried in over-the-air (OTA) radio interfaces as indicated by 311 in FIG. 3.

Continuing with FIG. 3, the UDM 370 may form a permanent storage or database for user contract and subscription data. The UDM may further include an authentication credential repository and processing function (ARPF, as indicated in 370 of FIG. 3) for storage of long-term security credentials for user authentication, and for using such long-term security credentials as input to perform computation of encryption keys as described in more detail below. To prevent unauthorized exposure of UDM/ARPF data, the UDM/ARPF 370 may be located in a secure network environment of a network operator or a third-party.

The AMF/SEAF 330 may communicate with the RAN 320, the SMF 340, the AUSF 360, the UDM/ARPF 370, and the PCF 322 via communication interfaces indicated by the various solid lines connecting these network nodes or functions. The AMF/SEAF 330 may be responsible for UE to non-access stratum (NAS) signaling management, and for provisioning registration and access of the UE 310 to the core network 130 as well as allocation of SMF 340 to support communication need of a particular UE. The AMF/SEAF 330 may be further responsible for UE mobility management. The AMF may also include a security anchor function (SEAF, as indicated in 330 of FIG. 3) that, as described in more detail below, and interacts with AUSF 360 and UE 310 for user authentication and management of various levels of encryption/decryption keys. The AUSF 360 may terminate user registration/authentication/key generation requests from the AMF/SEAF 330 and interact with the UDM/ARPF 370 for completing such user registration/authentication/key generation.

The SMF 340 may be allocated by the AMF/SEAF 330 for a particular communication session instantiated in the wireless communication network 300. The SMF 340 may be responsible for allocating UPF 350 to support the communication session and data flows therein in a user data plane and for provisioning/regulating the allocated UPF 350 (e.g., for formulating packet detection and forwarding rules for the allocated UPF 350). Alternative to being allocated by the SMF 340, the UPF 350 may be allocated by the AMF/SEAF 330 for the particular communication session and data flows. The UPF 350 allocated and provisioned by the SMF 340 and AMF/SEAF 330 may be responsible for data routing and forwarding and for reporting network usage by the particular communication session. For example, the UPF 350 may be responsible for routing end-end data flows between UE 310 and the DN 150, between UE 310 and the service applications 140. The DN 150 and the service applications 140 may include but are not limited to data network and services provided by the operator of the wireless communication network 300 or by third-party data network and service providers.

The PCF 322 may be responsible for managing and providing various levels of policies and rules applicable to a communication session associated with the UE 310 to the AMF/SEAF 330 and SMF 340. As such, the AMF/SEAF 330, for example, may assign SMF 340 for the communication session according to policies and rules associated with the UE 310 and obtained from the PCF 322. Likewise, the SMF 340 may allocate UPF 350 to handle data routing and forwarding of the communication session according to policies and rules obtained from the PCF 322.

While FIGS. 1-3 and the various exemplary implementations described below are based on cellular wireless communication networks, the scope of this disclosure is not so limited and the underlying principles are applicable to other types of wireless and wireline communication networks.

Network identity and data security in the wireless communication network 300 of FIG. 3 may be managed via user authentication processes provided by the AMF/SEAF 330, the AUSF 360, and the UDM/ARPF 370. In particularly, the UE 310 may first communicate with AMF/SEAF 330 for network registration and may then be authenticated by the AUSF 360 according to user contract and subscription data in the UDM/ARPF 370. Communication sessions established for the UE 310 after user authentication to the wireless communication network 300 may then be protected by the various levels of encryption/decryption keys. The generation and management of the various keys may be orchestrated by the AUSF 360 and other network functions in the communication network.

Figure 4:
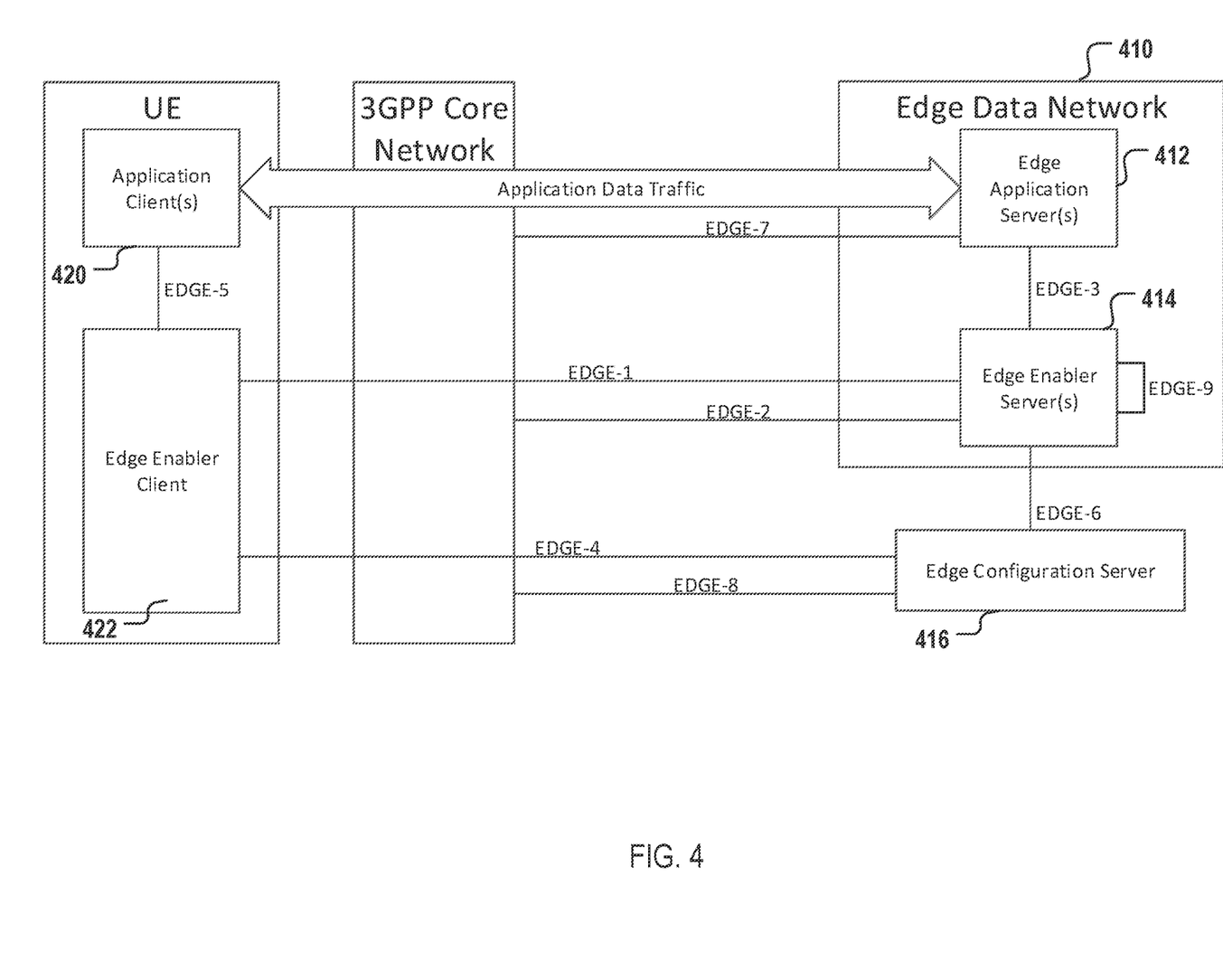
FIG. 4 shows an exemplary communication network including terminal devices, a core network, and an Edge Data Network (EDN).

FIG. 4 shows an example 5G system (5GS) with an Edge Data Network (EDN) 410. The EDN 410 may include a local Data Network. The EDN may include Edge Application Server (EAS) 412 and Edge Enabler Serve (EES) 414. An Edge Configuration Server (ECS) 416 provides configurations related to the EES 414, as well as details of the EDN 410 hosting the EES 414. The EAS 412 is the application server hosted in the EDN, performing the server functions. The UE contains Application Client 420 and the Edge Enabler Client 422. The Edge Application Server, the Edge Enabler Server and the Edge Configuration Server may interact with the 3GPP Core Network. The Application Client 420 of the UE connects to the Edge Application Server in order to run various applications and to take advantage of Edge Computing.

A high level procedure for initiating a communication session for edge computing with multiple steps is described below.

Step 1

A UE starts a primary authentication with an AMF. The AMF may belong to a home network of the UE, or a visitor network of the UE. A Protocol Data Unit (PDU) session is setup upon successful authentication. The UE may acquire certain ECS related information, such as an identifier of the ECS, or the routing information of the ECS through the primary authentication.

Step 2

The UE sends a registration request to the ECS identified by the ECS information received in step 1. The registration request is signed by the UE with a key and may further carry an identifier of the UE.

Step 3

The ECS, upon receiving the registration request from the UE, may authenticate the UE. The ECS may delegate the authentication request to a Network Exposure Function (NEF) of the core network which in turn forward the authentication request to the AMF with which the UE has done the primary authentication in step 1.

Step 4

Once the AMF authenticate the registration request, the result is forwarded by the NEF to the ECS. The ECS in turn sends a registration response message to the UE indicating that the registration is successful. The UE, after verifying the registration response message is sent from the legit ECS, proceed to establish a secured IPsec tunnel with the ECS.

In this disclosure, various example embodiments for authenticating the UE with the edge computing network are described. These embodiments provide at least the following technical characteristics:

1. Using a type of UE ID which is already provisioned or securely stored in the UE to uniquely identify the UE during the registration process. This UE ID also satisfies security and privacy requirement. In some implementations, a 5G-GUTI or SUPI of the UE may be used.

2. A UE specific edge computing key is disclosed. The UE specific edge computing key may be based on the UE ID as specified above in (1), and may be used to uniquely identify the AMF in the primary authentication. The UE specific edge computing key satisfies a randomness requirement among UEs. Furthermore, once authenticated with the Edge Configuration server, the UE specific edge computing key may also be updated dynamically and used for identifying EES, EAS, or other servers in the edge computing network as the UE continues to authenticate with the EES and the EAS.

3. When the UE is authenticated with different edge computing servers (i.e., ECS, EES, and EAS), a key encrypted based on the unique identification of the UE and each edge computing server is used for the authentication on both the edge computing server side and the UE side for bi-directional authentication. The key may be derived by the UE or the edge computing server directly, or maybe distributed from a trusted source such as the AMF or the NEF.

3. During the registration process, the selection of the NEF may be based on the UE specific edge computing key and is consistent during various stages of the authentication process, even when multiple NEFs are present in the network.

4. The NEF does not need to maintain a mapping relationship between the UE ID and the AMF and the NEF may be able to route an authentication/verification request from the edge computing network to the proper AMF.

5. The authentication procedure supports a dual registration mode where the UE is connected with AMFs belonging to two different Public Land Mobile Networks (PLMN).

UE Registration with ECN (Embodiment 1)

Figure 5:
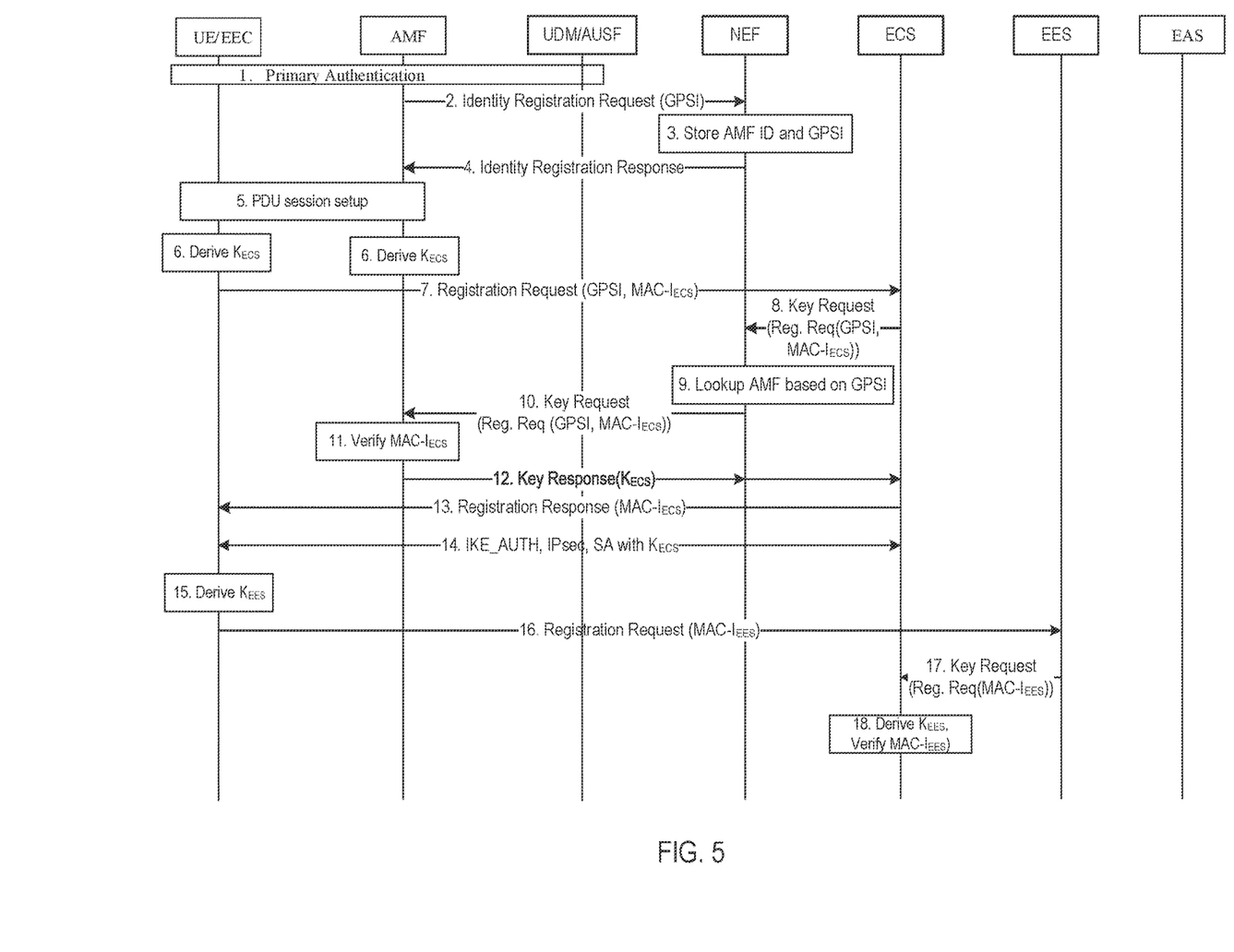
FIG. 5 and FIG. 6 shows an exemplary logic flow for UE authentication with the EDN.
Figure 6:
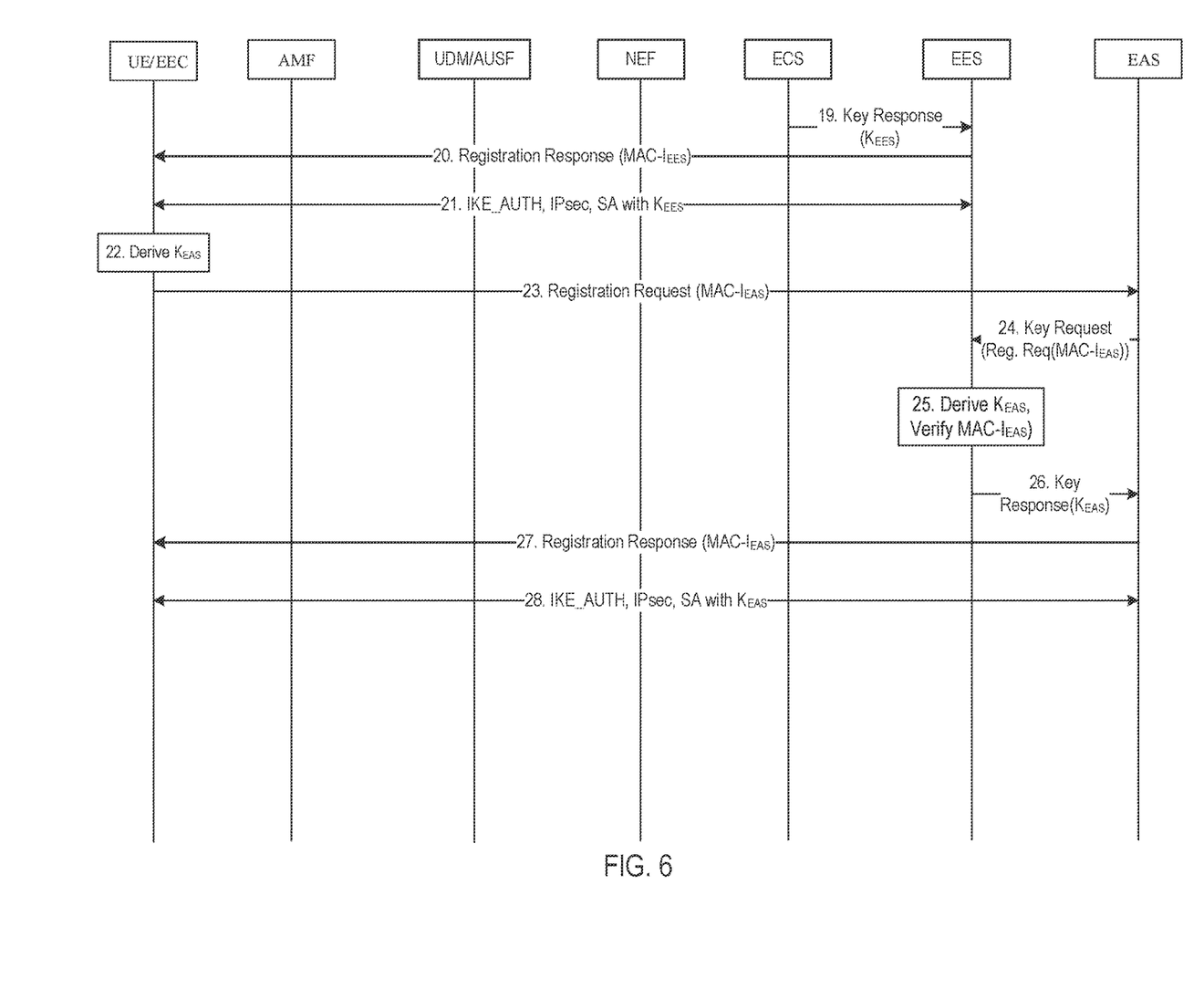

FIG. 5 to FIG. 6 show exemplary logic flows for UE authentication and authorization procedure with the EDN. The specific exemplary steps for the UE registration/authentication are illustrated by steps 1 to 28 in FIG. 5 and FIG. 6.

Step 1

The UE performs normal primary authentication and registration to the network. Specifically, the UE may start the authentication and registration procedure with an AMF/SEAF and a UDM/ASUF of the core network. The UE may be Multi-access Edge Computing (MEC) capable and may indicate this information in the MEC capabilities to the AMF/SEAF during the registration procedure.

Step 2

The AMF sends an Identifier Registration Request to an NEF including the Generic Public Subscription Identifier (GPSI) of the UE. The GPSI may be used for addressing a UE in a different data network, such as an ECN.

The GPSI may be configured in the UE and sent to the AMF in step 1, or may be configured in the subscriber data and provisioned to the UE after PDU session establishment (as in step 5 below), or both.

Step 3

The NEF stores both the GPSI and the AMF ID.

Step 4

The NEF acknowledges the Identifier Registration with the AMF and may subscribe to AMF updates.

Step 5

The UE establishes a Protocol Data Unit (PDU) session with the AMF for IP connectivity.

Step 6

If the UE is MEC capable, then the UE and the AMF derive a key $K_{ECS}$ from the AMF key $K_{AMF}$ for authentication with the ECS. Optionally, The UE and the AMF initialize the CounterECS as a message counter to the ECS when the $K_{ECS}$ is derived and the counter is stored for the lifetime of the $K_{ECS}$.

Step 7

The UE sends a Registration Request with a MAC-IEcs and the GPSI to the ECS. The MAC-IEcs is computed in a similar way as, for example, the SoR-MAC-IAUSF. For example, the MAC-IEcs may be based on the payload of the Registration Request, a counter of the ECS messages CounterECS as described in step 6, and a key $K_{ECS}$ (edge computing configure key) to the KDF algorithm, e.g., using the KDF algorithm with $K_{ECS}$ as the key, and payload of the Registration Request together with the ECS messages counter as the input to generate an output. The MAC-IEcs is identified with the 128 least significant bits of the output of the KDF encryption. The UE monotonically increment CounterECS for each additional calculated MAC-IECS. In some implementations, the usage of the ECS messages counter CounterECS may be optional.

Step 8

Since the UE is not authenticated at the ECS, the ECS sends a Key Request including the Registration Request with the MAC-IEcs to the NEF, which is selected based on the GPSI. The NEF selection may be made in various manners and the ECS may determine the IP address(es)/port (s) of the NEF by performing a DNS query using the GPSI, or by using a locally configured NEF identifier/address.

Step 9

The NEF then authorizes the request from the ECS and identifies the AMF ID based on the GPSI. The NEF stores the contact information of the ECS (e.g. IP address, source Network Access Identifier (NAI) of the ECS, etc.) together with the GPSI in order to route the answer from the AMF back to the ECS.

Step 10

The NEF forwards the Key Request including the Registration Request including the MAC-IEcs and the GPSI to the AMF.

Step 11

The AMF verifies the MAC-IEcs of the Registration Request. The AMF computes with the key $K_{ECS}$ a local copy of the MAC-IEcs over the Registration Request payload in a similar way as in step 7, and compares the computed local copy of the MAC-IEcs with the MAC-IEcs included in the registration request message. If the two MAC-IEcs match, the message can be authenticated as being sent by the UE, and the AMF monotonically increments CounterECS. In some implementations, the usage of the ECS messages counter CounterECS may be optional.

Step 12

The AMF sends a Key Response to the ECS, including the result of the authentication as well as the $K_{ECS}$.

Step 13

Based on the authentication result, the ECS decides whether to accept or to reject the Registration Request from the UE. The ECS sends a Registration Response message to the UE including the authentication result and protects the message with a MAC-IEcs based on the received key $K_{ECS}$ in a similar way as the UE protected the payload of the registration request message in step 7.

Step 14

The UE verifies the MAC-IEcs and if authentication result and verification of the registration response message are successful, the UE establishes an IPsec SA (Security Association) between the UE and the ECS by using the ECS key $K_{ECS}$. All messages from now on are confidentiality and integrity protected by the IPsec tunnel.

Step 15

The UE derives the key $K_{EES}$ from the key $K_{ECS}$ using an MEC Key Distinguisher flag as input to the KDF.

Step 16

The UE sends a Registration Request with a MAC-IEES to the EES. The MAC-IEES is computed based on the payload of the Registration Request and the key $K_{EES}$ to the KDF algorithm. The MAC-IEES is selected as the 128 least significant bits (LSB) of the output of the KDF encryption.

Step 17

Since the UE is not authenticated at the EES, the EES sends a Key Request to the ECS. The selection of the ECS may be based on an UE identifier.

Step 18

The ECS identifies the UE based on the UE identifier and derives the key $K_{EES}$ in a similar way as the UE in step 6 or 15. The ECS verifies the MAC-IEES similar to step 11. The registration request message can be authenticated to be sent by the UE if the verification is successful.

Step 19

The ECS sends a Key Request Response to the EES, including the result of the authentication as well as the $K_{EES}$.

Step 20

Based on the authentication result, the EES decides whether to accept or to reject the Registration Request from the UE. The EES sends the Registration Response message to the UE including the authentication result and protects the message with a MAC-IEES based on the received key $K_{EES}$ in a similar way as the UE protected the payload of the registration request message in step 7.

Step 21

The UE verifies the MAC-IEES and if authentication result and verification of the message are successful, then the UE establishes an IPsec SA between the UE and the EES by using the EES key $K_{EES}$. All messages from now on are confidentiality and integrity protected by the IPsec tunnel.

Step 22

The UE derives the application server key $K_{EAS}$ from the key $K_{EES}$ using an MEC Key Distinguisher flag as input to the KDF.

Step 23

The UE sends a Registration Request with a MAC-$I_{EAS}$ to the EAS. The MAC-$I_{EAS}$ is computed based on the payload of the Application Registration Request, and the key $K_{EAS}$ to the KDF. The MAC-$I_{EAS}$ may be identified with the 128 LSBs of the output of the KDF.

Step 24

Since the UE is not authenticated at the EAS, the EAS sends a Key Request to the EES. The selection of the EES may be based on the UE identifier.

Step 25

The EES identifies the UE based on the UE identifier and derives the key $K_{EAS}$ in a similar way as the UE in step 22. The EES verifies the MAC-$I_{EAS}$ similar to step 11. The registration request message may be authenticated to be sent by the UE if the verification is successful.

Step 26

The EES sends a Key Request Response to the EAS, including the result of the authentication as well as the $K_{EAS}$.

Step 27

Based on the authentication result, the EAS decides whether to accept or to reject the Registration Request from the UE. The EAS sends the Registration Response message to the UE including the authentication result and protects the message with a MAC-$I_{EAS}$ based on the received key $K_{EAS}$ in a similar way as the UE protected the payload of the message in step 7.

Step 28

The UE verifies the MAC-$I_{EAS}$ and if authentication result and verification of the message are successful, then the UE establishes an IPsec SA between the UE and EAS by using the application server key $K_{EAS}$. All messages from now on are confidentiality and integrity protected by the IPsec tunnel.

UE Registration with ECN (Embodiment 2)

Figure 7:
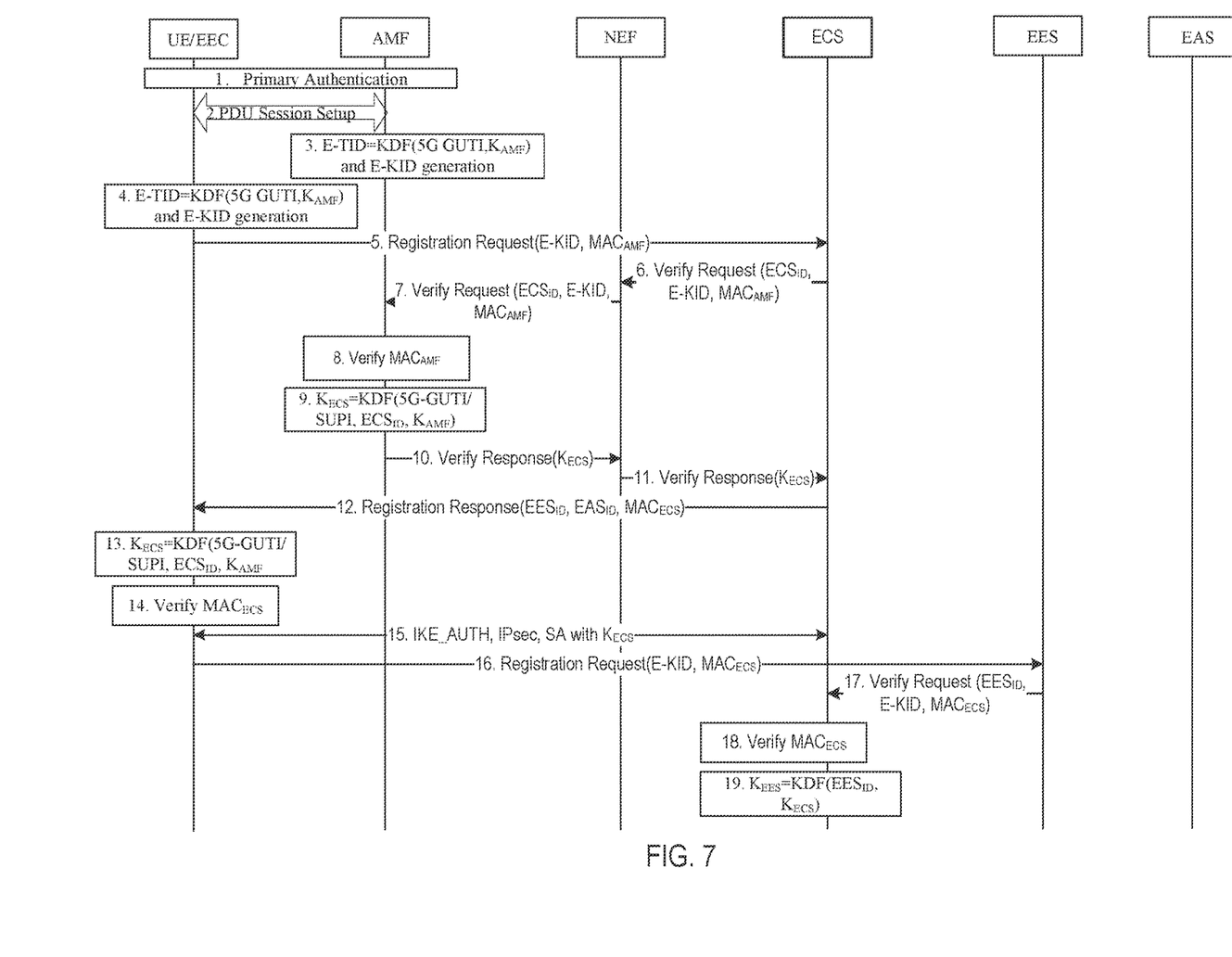
FIG. 7 and FIG. 8 shows another exemplary logic flow for UE authentication with the EDN.
Figure 8:
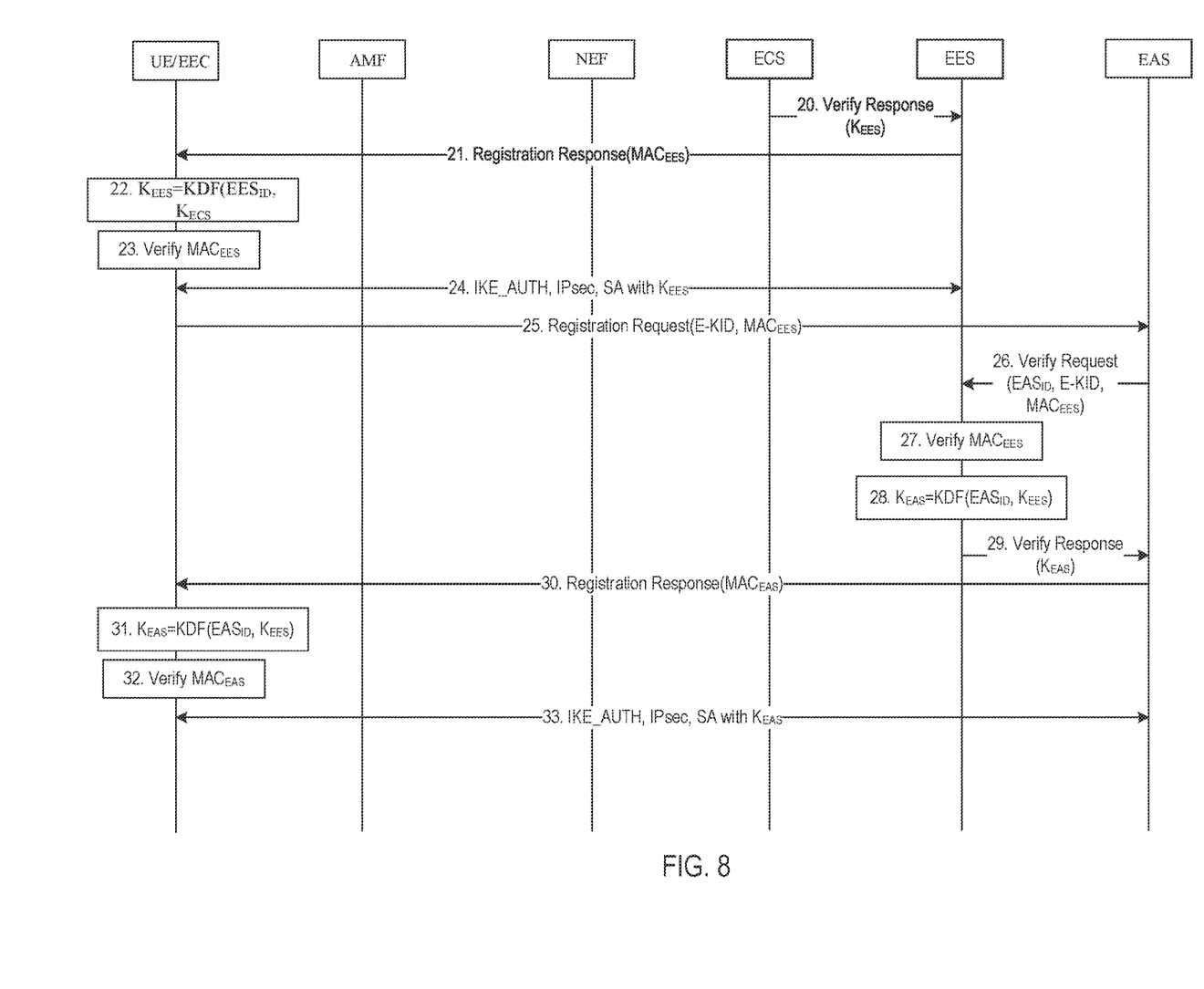

FIG. 7 to FIG. 8 show exemplary logic flows for UE authentication and authorization procedure with the EDN based on a unique identification of the UE, such as 5G-GUTI or SUPI, when the UE has subscribed for the edge computing service. The 5G-GUTI or the SUPI is provisioned or stored in the UE. The specific exemplary steps for the UE registration/authentication are illustrated by steps 1 to 32 in FIG. 7 and FIG. 8.

Step 1

The UE seeking edge computing service may start with performing normal primary authentication and registration to the network. Specifically, the UE may start the authentication and registration procedure with an AMF or an SEAF of the network. The UE may be Multi-access Edge Computing (MEC) capable and may indicate such MEC capabilities to the AMF/SEAF during this procedure.

The AMF/SEAF may be in the UE's home network, or may be in the UE's visitor network. Before the primary authentication and registration, the UE may not have knowledge on the edge computing servers associated with the current AMF/SEAF.

Step 2

The UE establishes a Protocol Data Unit (PDU) session for IP connectivity. The information of edge computing server including the ECS may be transferred from the network to the UE by Protocol Configuration option (PCO). This information may include address, identifier, or other configuration information of the edge computing server. The UE may use this information in subsequent steps, for example, for routing messages to the edge computing server.

Step 3

The AMF/SEAF may generate a temporary edge computing key identifier E-TID for the UE. For example, E-TID=KDF (5G-GUTI or SUPI, $K_{AMF}$ or $K_{SEAF}$). The formula may be interpreted as using $K_{AMF}$ or $K_{SEAF}$ as the key to encrypt 5G-GUTI or SUPI based on the KDF algorithm. The term "KDF" represents an exemplary key generation algorithm involving HMAC-SHA-256 (256-bit Hash-based Message Authentication Code for Secure Hash Algorithm). The output of the KDF encryption, for example, may be a key with 256 bits length. There is no limitation on which algorithm may be used for the encryption in this disclosure. $K_{AMF}$ or $K_{SEAF}$ represents the base keys for the AMF or SEAF, respectively. 5G-GUTI is used to provide an unambiguous identification of the UE that does not reveal the UE or the UE's permanent identity in the network, for example, the 5G system. As an example, the format of a 5G-GUTI may be: <5G-GUTI>=<GUAMI><5G-TMSI>, where <GUAMI>=<MCC><MNC><AMF Identifier>. GUMAI stands for Globally Unique AMF ID which uniquely identifies an AMF globally. MCC represents Mobile Country Code, and MNC represents Mobile Network Code. <AMF Identifier>=<AMF Region ID><AMF Set ID><AMF Pointer>. 5G-TMSI (Temporary Mobile Subscriber Identity) uniquely identified the UE within an AMF. SUPI (Subscription Permanent Identifier) is a globally unique 5G Subscription Permanent Identifier allocated to each subscriber in the network such as a 5G System.

In this implementation, a unique key, E-KID, serving as the edge computing key of the UE, is disclosed. In some implementations, E-KID may be in an NAI (Network Access Identifier) format as specified such as username@realm. The username part may include the GUAMI and the E-TID, and the realm part may include a Local Network Identifier associated with the UE. By carrying both the GUAMI and the E-TID, E-KID may be used to uniquely identify the UE and the AMF associated with the UE, regardless of whether the AMF is in the UE's home network or in the UE's visitor network. Also as described above, E-TID contains the unique identifier of the UE which is encrypted with the base key of AMS/SEAF. Encryption based on 5G-GUTI or SUPI facilitates the randomness of the E-TID (to, for example, avoid key collision between UEs) and the randomness is also carried to the E-KID.

Step 4

Before the UE initiates an Application Registration procedure with the EDN, the UE generates an E-KID in the same way as the AMF, as described in step 3. As such, both the AMF/SEAF and the UE maintains a copy of the same E-KID.

Step 5

The UE sends a Registration Request with a MAC$_{AMF}$ and the E-KID to the ECS.

The MAC$_{AMF}$ may be encrypted based on the payload (or alternatively referred to as raw data) of the Registration Request. For example, the encryption may be based on the AMF key or the SEAF key (denoted as $K_{AMF}$ and $K_{SEAF}$, respectively) and the payload (raw data) of the Registration Request. The encryption may be based on the KDF algorithm. Optionally, a counter of the ECS messages CounterECS may be combined with the payload data to the encryption to prevent replay attack. The UE monotonically increment CounterECS for each additional calculated $MAC_{AMF}$. In some embodiments, the CounterECS may be the NAS (Non Access Stratus) Uplink Counter. In some embodiments, the $MAC_{AMF}$ may include the 128 least significant bits (LSB), or the 128 most significant bits (MSB) of the output of the encryption, such as the output of the KDF algorithm.

Step 6

Since the UE has not been authenticated at the ECS, the ECS sends a Verify Request including the Registration Request with the $MAC_{AMF}$ to the NEF (Network Exposure Function), where the NEF is associated with the AMF and may be selected based on the E-KID of the UE. For example, the ECS may determine the IP address(es)/port(s) of the NEF by performing a DNS query using the E-KID, or by using a locally configured NEF identifier/address.

Step 7

The NEF forwards to the AMF the Verify Request including the Registration Request, the $MAC_{AMF}$, and the E-KID. As described above, the E-KID carries the global identifier (e.g., GUAMI) of the AMF, so the NEF is able to uniquely identify the particular AMF and routes the Verify Request accordingly.

Step 8

The AMF, upon receiving the Verify Request, verifies the $MAC_{AMF}$ of the Registration Request. In particular, the AMF computes with the key $K_{AMF}$ or $K_{SEAF}$ a local copy of the $MAC_{AMF}$ over the Registration Request payload in the similar way as the UE does in step 5. The AMF then compares the calculated result with the $MAC_{AMF}$ included in Verify Request message (i.e., compare the local copy of the $MAC_{ECS}$ with the received $MAC_{ECS}$). If they are identical, the Verify Request may be authenticated to be sent by the UE. Optionally, the AMF monotonically increments CounterECS.

Step 9

The AMF/SEAF may generate an edge computing configure key $K_{ECS}$ for the UE with $K_{ECS}$=KDF (5G-GUTI or SUPI, $ECS_{ID}$, $K_{AMF}$ or $K_{SEAF}$) $K_{AMF}$ and $K_{SEAF}$ represent the base key of the AMF and the SEAF, respectively. The 5G-GUTI, or the SUPI, as described above, may be used to uniquely identify the UE in the network. $ECS_{ID}$ is the identifier of the ECS and may be in the FQDN (Fully Qualified Domain Name) format.

Step 10

The AMF sends a Verify Response to the NEF, including the result of the authentication as well as the $K_{ECS}$ computed in step 9.

Step 11

The NEF forwards the Verify Response including $K_{ECS}$ to the ECS.

Step 12

Based on the authentication result, the ECS decides whether to accept or to reject the Registration Request from the UE. The ECS sends the Registration Response message to the UE including the authentication result and protects the response message with a $MAC_{ECS}$ based on the received key $K_{ECS}$ in a similar way as the UE protects the payload of the request message in step 5. Optionally, the $EES_{ID}$ and/or the $EAS_{ID}$, which are the respective identifiers of the EES and the ECS, may be included in the message. Similar to the $ECS_{ID}$, the $EES_{ID}$ and the $EAS_{ID}$ may also be in the FQDN format.

Step 13

With the knowledge of $ECS_{ID}$, the UE may generate its edge computing configure key $K_{ECS}$=KDF (5G-GUTI or SUPI, $ECS_{ID}$, $K_{AMF}$ or $K_{SEAF}$) $K_{AMF}$ and $K_{SEAF}$ represent the base key for the AMF and the SEAF, respectively. In some implementations, $ECS_{ID}$ may be of the FQDN format of the ECS which identifies the ECS.

Step 14

With the same concept as step 8, the UE verifies the $MAC_{ECS}$ to ensure that the Registration Response message is indeed sent by the legit ECS. That is, the UE computes a local copy of the $MAC_{ECS}$ with the key $K_{ECS}$ over the Registration Response payload and compares the local copy of the $MAC_{ECS}$ with the $MAC_{ECS}$ included in the request message received.

Step 15

Once the Registration Response message is verified successfully, the UE establishes an IPsec SA (Security Association) between the UE and the ECS by using the ECS key $K_{ECS}$. All messages from now on are confidentiality and integrity protected by the IPsec tunnel.

Step 16

Optionally, the UE may further try to establish a secure communication link with the EES.

The UE may send a Registration Request with its E-KID and a $MAC_{ECS}$ to the EES. The $MAC_{ECS}$ may be encrypted based on the payload of the Registration Request, and the edge computing configure key $K_{ECS}$. In some embodiments, the $MAC_{ECS}$ includes the 128 least significant bits (LSB), or the 128 most significant bits (MSB) of the output of the encryption, such as the output of the KDF algorithm.

Optionally, the UE may add the $ECS_{ID}$ to its E-KID, or replace the GUAMI in the E-KID with the $ECS_{ID}$. After such update to the E-KID, the E-KID may carry the identifier of the ECS for subsequent use to facilitate identifying the ECS.

Step 17

Since the UE has not been authenticated at the EES, the EES sends a Verify Request to the ECS with the $MAC_{ECS}$ and the E-KID received from Registration Request, and an $EES_{ID}$, which is the identifier of the EES. The Verify Request also carries the Registration Request that the EES receives in step 16. The selection of the ECS may be based on the $ECS_{ID}$ in the E-KID.

Step 18

The ECS received Verify Request from the EES. The ECS may identify the UE based on the E-KID. The ECS verifies the $MAC_{ECS}$ of the Registration Request, similar to step 8 and step 14 and not described in further detail herein.

Step 19

The ECS may generate the edge computing enabler key $K_{EES}$=KDF ($EES_{ID}$, $K_{ECS}$). $K_{ECS}$ represents the base key for the ECS, which may be sent to the ECS in step 11 as described above. In some implementations, $EES_{ID}$ may be the of FQDN format of the EES which identifies the EES Step 20

If the verification is successful, the ECS sends a Verify Request Response to the EES, including the result of the authentication as well as the $K_{EES}$ computed in step 19.

Step 21

Based on the authentication result the EES decides whether to accept or to reject the Registration Request from the UE. The EES sends the Registration Response message to the UE including the authentication result and protects the message with a $MAC_{EES}$ based on the received key $K_{EES}$ in step 19 in a similar way as the UE protected the payload of the message in step 16. The identifier of the EAS, $EAS_{ID}$, may be included in the Registration Response message.

Step 22

The UE may generate the edge computing enabler key $K_{EES}$=KDF ($EES_{ID}$, $K_{ECS}$). $K_{ECS}$ represents the base key of the ECS. $EES_{ID}$ is the identifier of the EES and may be in the FQDN format. The UE may receive the $EES_{ID}$ as described above in step 12.

Step 23

With the same concept as step 8 or step 14, the UE verifies the $MAC_{EES}$ to ensure the Registration Response message is indeed sent by the legit EES. That is, the UE computes a local copy of the $MAC_{EES}$ with the key $K_{EES}$ over the Registration Response payload and compares the local copy of the $MAC_{EES}$ with the $MAC_{EES}$ included in message received.

Step 24

Once the Registration Response message is verified successfully, the UE establishes an IPsec SA between the UE and the EES by using the edge computing enabler key $K_{EES}$. All messages are now confidentiality and integrity protected by the IPsec tunnel.

Step 25

Optionally, the UE may further try to establish a secure communication link with the Edge Application Server (EAS).

The UE sends a Registration Request with its E-KID and a $MAC_{EES}$ to the EAS. The $MAC_{EES}$ may encrypted based on the payload of the Registration Request, and the edge computing enabler key $K_{EES}$. In some embodiments, the $MAC_{EES}$ includes the 128 LSBs, or the 128 MSBs of the output of the encryption, such as the output of the KDF algorithm.

Optionally, the UE may add the $EES_{ID}$ to its E-KID, or replace the $ECS_{ID}$ in the E-KID with the $EES_{ID}$ (if $ECS_{ID}$ is added to the E-KID in step 16). After such update to the E-KID, the E-KID may carry the identifier of the EES for subsequence use.

Step 26

Since the UE has not been authenticated at the EAS, the EAS sends a Verify Request to the EES with the $MAC_{EES}$ and the E-KID received from Registration Request, and an $EAS_{ID}$ which is the identifier of the EAS. The Verify Request also carries the Registration Request that the EAS receives in step 25. The selection of the EES may be based on the $EES_{ID}$ in the E-KID.

Step 27

The EES receives the Verify Request from the EAS. The EES may identify the UE based on the E-KID. The EES computes a local copy of the $MAC_{EES}$ with the key $K_{EES}$ over the Registration Request payload and compares the local copy of the $MAC_{EES}$ with the $MAC_{EES}$ included in message received.

Step 28

The EES may generate the edge computing application key $K_{EAS}$=KDF ($EAS_{ID}$, $K_{EES}$) for the EAS. $K_{EES}$ represents the edge computing enabler key. In some implementations, $EAS_{ID}$ may be of the FQDN format of the EAS which identifies the EAS.

Step 29

If the verification is successful, the EES sends a Verify Request Response to the EAS, including the result of the authentication as well as the $K_{EAS}$ as computed in step 28.

Step 30

Based on the authentication result the EAS decides whether to accept or to reject the Registration Request from the UE. The EAS sends the Registration Response message to the UE including the authentication result and protects the message with a $MAC_{EAS}$ based on the edge computing application key $K_{EAS}$ received in step 29, in a similar way as the UE protected the payload of the message in step 25.

Step 31

The UE may generate the edge computing application key $K_{EAS}$=KDF ($EAS_{ID}$, $K_{EES}$). $K_{EES}$ represents the edge computing enabler key. In some implementations, $EAS_{ID}$ may be in the FQDN format which identifies the EAS.

Step 32

The UE verifies the $MAC_{EAS}$ to ensure the Registration Response message is indeed sent by the legit EAS. That is, the UE computes a local copy of the $MAC_{EAS}$ with the key $K_{EAS}$ over the Registration Response payload and compares the local copy of the $MAC_{EAS}$ with the $MAC_{ECS}$ included in the Registration Response message received.

Step 33

The UE establishes an IPsec SA between the UE and EAS by using the EAS key $K_{EAS}$. All messages are now confidentiality and integrity protected by the IPsec tunnel.

In the embodiment above, to accommodate the Edge Computing environment, an edge computing key E-KID for a UE is disclosed. The E-KID includes a unique identifier of the UE which is encrypted with base encryption key of an AMF or SEAF managing the UE. The unique identifier of the UE includes a 5G-GUTI or SUPI which is provisioned or store in the UE. The E-KID further includes a unique identifier for identifying the AMF or the SEAF globally. Optionally, the E-KID may further include a local network identifier associated with the UE. Based on the E-KID, the UE first establish a secure communication link with the ECS of a computing network through a registration request to the ECS. The E-KID may be further update during different stages of the authentication process. For example, after the ECS verifies the UE, the ECS may add identifiers of other servers (e.g., EES and ECS) in the ECN to the E-KID and return the E-KID to the UE. The UE may use the updated E-KID for subsequent registration with the other servers. Furthermore, in some embodiments, the AMF/SEAF may be only involved during the UE's registration with the ECS. After the UE and the ECS authenticate each other, UE's subsequent registration with other servers in the ECN does not need further involvement of the AMF/SEAF anymore.

The accompanying drawings and description above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for establishing a secured communication link between a terminal device and a computing network providing application services, performed by the terminal device in a communication network, the method comprising:
   generating a device computing key of the terminal device based on a unique identifier of the terminal device;
   generating a registration request signature based on raw data of a registration request with a configuration server of the computing network, an encryption key of an access server managing the terminal device, and a message counter recording a count of messages sent to the configuration server; and
   sending a first message comprising the device computing key and the registration request signature to the configuration server for requesting service grant with the computing network.

2. The method of claim 1, wherein the unique identifier of the terminal device comprises at least one of:
   a 5G Global Unique Temporary Identifier (5G-GUTI); or
   a subscription Permanent Identifier (SUPI); and
   wherein the unique identifier of the access server comprises a Globally Unique AMF ID (GUAMI).

3. The method of claim 1, wherein:
   the access server comprises at least one of:
   an Access and Mobility Management Function (AMF); or
   a Security Anchor Function (SEAF); and
   the computing network comprises at least one of:
   a configuration server;
   an enabling server;
   an application server; or
   an exposure server.

4. The method of claim 1, wherein the message counter comprises a Non Access Stratum (NAS) uplink counter.

5. The method of claim 1, wherein before generating the device computing key, the method further comprises generating a temporary identifier of the terminal device using a hash based secure algorithm, based on the encryption key of the access server, and the unique identifier of the terminal device.

6. The method of claim 5, wherein generating the device computing key comprises:
   generating the device computing key based on the temporary identifier of the terminal device and the unique identifier of the access server within the communication network.

7. The method of claim 6, wherein the device computing key is in a Network Access Identifier (NAI) format, and a username part of the device computing key comprises the unique identifier of the access server and the temporary identifier of the terminal device.

8. The method of claim 1, further comprising:
   receiving a first response message comprising a first registration response and a first registration response signature from the configuration server, wherein:
   the first registration response signature is encrypted based on raw data of the first registration response and a configuration server key of the configuration server computed by the access server, the access server is identified by the computing network via the device computing key, the configuration server key is encrypted based on the unique identifier of the terminal device, the encryption key of the access server managing the terminal device, and an identifier of the configuration server;
   computing a local copy of the configuration server key based on the unique identifier of the terminal device, the encryption key of the access server managing the terminal device, and the identifier of the configuration server;
   generating a local copy of the first registration response signature based on the raw data of the first registration response and the local copy of the configuration server key;
   comparing the local copy of the first registration response signature with the first registration response signature in the first response message; and
   in response to the two signatures matching, establishing the secured communication link between the terminal device and the configuration server.

9. The method of claim 8, wherein the first response message further comprises at least one of an identifier of an enabling server in the computing network associated with the configuration server or an identifier of an application server in the computing network associated with the configuration server.

10. A computer program product comprising a non-transitory computer-readable program medium with computer code stored thereupon, the computer code, when executed by one or more processors, causing the one or more processors to implement a method of claim 1.

11. A method for authenticating a registration request from a terminal device performed by an access server, wherein the terminal device is managed by the access server and the method comprises:
- generating a temporary identifier of the terminal device using a hash based secure algorithm, based on an encryption key of the access server, and a unique identifier of the terminal device; and
- generating a device computing key of the terminal device based on the temporary identifier of the terminal device and the unique identifier of the access server;
- receiving a verification request from an exposure server in a computing network, wherein the verification request comprises at least one of:
  - a registration request initiated from the terminal device, the registration request being forwarded to the exposure server by a configuration server in the computing network used for requesting terminal device access to the computing network;
  - a registration request signature encrypted based on raw data of the registration request, and an encryption key of the access server;
  - the device computing key of the terminal device; or
  - an identifier of the configuration server;
- generating a local copy of the registration request signature based on raw data of the registration request and the encryption key of the access server;
- comparing the local copy of the registration request signature with the registration request signature in the verification request; and
- in response to the two signatures matching, sending a verification response to the exposure server.

12. The method of claim 11, wherein:
- before sending the verification response, the method further comprises generating a configuration server key of the configuration server based on the unique identifier of the terminal device, the encryption key of the access server, and an identifier of the configuration server; and
- in response to the two signatures matching, sending the verification response to the exposure server comprises in response to the two signatures matching, sending the verification response comprising the configuration server key to the exposure server.

13. The method of claim 11, wherein the unique identifier of the terminal device comprises at least one of:
- a 5G Global Unique Temporary Identifier (5G-GUTI); or
- a subscription Permanent Identifier (SUPI).

14. The method of claim 11, wherein the exposure server routes the verification request to the access server based on the device computing key.

15. An access server comprising a memory for storing computer instructions and a processor in communication with the memory, wherein the processor, when executing the computer instructions, is configured to implement a method of claim 11.

16. A computer program product comprising a non-transitory computer-readable program medium with computer code stored thereupon, the computer code, when executed by one or more processors, causing the one or more processors to implement a method of claim 11.

17. A terminal device comprising a memory for storing computer instructions and a processor in communication with the memory, wherein, when the processor executes the computer instructions, the processor is configured to cause the device to:
- generate a device computing key of the terminal device based on a unique identifier of the terminal device;
- generate a registration request signature based on raw data of a registration request with a configuration server of a computing network, an encryption key of an access server managing the terminal device, and a message counter recording a count of messages sent to the configuration server; and
- send a first message comprising the device computing key and the registration request signature to the configuration server for requesting service grant with the computing network.

* * * * *